(12) United States Patent
Sinclair

(10) Patent No.: US 7,127,270 B2
(45) Date of Patent: Oct. 24, 2006

(54) WIRELESS COMMUNICATION AND CONTROL SYSTEM

(75) Inventor: John Sinclair, Tarbert (GB)

(73) Assignee: SRS Technology Ltd. (GB)

( * ) Notice: Subject to any disclaimer, the term of this patent is extended or adjusted under 35 U.S.C. 154(b) by 528 days.

(21) Appl. No.: 10/110,521

(22) PCT Filed: Oct. 11, 2001

(86) PCT No.: PCT/GB00/03891

§ 371 (c)(1),
(2), (4) Date: Aug. 12, 2002

(87) PCT Pub. No.: WO01/27893

PCT Pub. Date: Apr. 19, 2001

(65) Prior Publication Data

US 2003/0073461 A1    Apr. 17, 2003

(30) Foreign Application Priority Data

Oct. 12, 1999    (GB) .................................... 9924177

(51) Int. Cl.
*H04M 1/00*    (2006.01)
(52) U.S. Cl. ............................. 455/556.1; 455/556.2; 455/557; 455/410; 455/420; 455/411; 455/419; 340/426.25; 340/539.16; 340/568.2; 340/571; 340/572.1; 340/572.2; 340/825.19
(58) Field of Classification Search ............ 455/556.1, 455/556.2, 557, 11.1, 410, 420; 340/426.25, 340/425.5, 825.19, 539.16, 568.2, 571, 572.1, 340/572.2
See application file for complete search history.

(56) References Cited

U.S. PATENT DOCUMENTS

| 4,418,333 | A | * | 11/1983 | Schwarzbach et al. . | 340/310.01 |
| 4,703,306 | A | * | 10/1987 | Barritt ................... | 340/310.08 |
| 4,885,766 | A | * | 12/1989 | Yasuoka et al. ....... | 379/102.03 |
| 5,352,957 | A |   | 10/1994 | Werner ................. | 315/291 |
| 5,519,878 | A |   | 5/1996 | Dolin, Jr. .............. | 395/800 |
| 6,021,324 | A | * | 2/2000 | Sizer et al. ............ | 455/403 |
| 6,055,418 | A | * | 4/2000 | Harris et al. .......... | 455/91 |
| 6,349,351 | B1 | * | 2/2002 | Shimizu et al. ....... | 710/38 |
| 6,678,004 | B1 | * | 1/2004 | Schultheiss et al. ... | 348/552 |

FOREIGN PATENT DOCUMENTS

| EP | 0626635 | 11/1994 |
| EP | 0748105 | 12/1996 |
| WO | WO 8606890 | 11/1986 |

* cited by examiner

Primary Examiner—Marceau Milord
(74) Attorney, Agent, or Firm—Gifford, Krass, Groh, Sprinkle, Anderson & Citkowski, P.C.

(57) ABSTRACT

A communication and control system for use by the disabled and their caretakers. The system has at least two communication modules, each module having a processing unit which has a unique identification code. Each communication module also has a unique hierarchical address corresponding to the identification code, the address defining the physical location of the module. The hierarchical address represents at least two physical domains. Each commnunication module further includes a processing unit having coupled to it one or both of a signal receiver and a signal transmitter, and at least one transducer for detecting a physical parameter and for broadcasting packets of data indicative of the status of a module or for controlling a remote module.

10 Claims, 10 Drawing Sheets

COMMAND: TURN HALL LAMP ON WOULD INITIATE THE FOLLOWING
PACKET COMMUNICATION

WIRELESS COMMUNICATION AND CONTROL SYSTEM

FIELD OF THE INVENTION

The present invention relates to a wireless communication and control system particularly, but not exclusively, for use in a domestic environment to allow a user at one location to operate equipment at a remote location. The invention particularly relates to a wireless communication and control system for use by the disabled, and carers for the disabled, in a domestic environment.

BACKGROUND OF THE INVENTION

In many situations it is desirable for a user to control equipment or appliances remotely from a control unit which may be hardwired or wireless. This already exists with infrared (IR) controls for TV/video, HiFi and the like. In a domestic environment it is also desirable to control the operation of other items, such as lights, curtains, doors and heaters. Various systems have been proposed such as X10 (X10 Powerhouse, U.S.A.)

Such systems generally have codes which require that each device has an unique code and the control unit has a list of addresses for each device. When multiple controllers are located in the same domain or environment, each controller has to have a copy of the device address list. This means that the list has to be copied and updated in each controller and there is no clear hierarchy of addresses to allow straightforward overall control of groups of devices in a domain.

In addition, people with physical disabilities often have great difficulty coping within a domestic environment. Actions able-bodied people take for granted, such as turning on or off a light or answering the telephone, are impossible for a great many physically disabled people. Such people often rely on a fulltime carer, such as a nurse or a member of the family to undertake these tasks. Hiring a carer is costly and, unfortunately, tends to result in the disable person having little say in how their house is run as the carer or relative tends to adopt set routines and controls the environment as they think best. This is particularly evident when the disabled person has limited verbal skills.

However, many physically disabled people are capable of managing with only limited assistance from a carer, such as at bathtimes and mealtimes, if they are provided with a suitable control system which allows them to operate standard domestic appliances. Such control systems do exist but are based on interfaces developed to allow severely disabled individuals to operate personal computers. These interfaces limit the input requirements of the device so that, instead of a user implementing a sequence of keystrokes requiring manual dexterity, all functions are accessible by only one to two switches. These switches are generally in the form of a joystick which can be pushed into position or a mouthpiece switch into which the user may suck or blow to perform switch selection.

An example of such a control system is disclosed in U.S. Pat. No. 4,979,094 to Possum Controls Limited. A central microprocessor-based control unit is positioned within the home. Independent input stations are located in each room for allowing access by the disabled user. Each input station is connected to the control unit either by direct wiring or using serial wiring linking the stations, and each input station is operable by the disabled user in the manner described above in which the user performs a selection from a coloured scanning menu display appearing on a TV-type screen. The controlled domestic appliances each have a switching unit fitted either within the appliance or via a specially adapted mains plug. The domestic appliances are all connected to the control unit, but may be wired in series to reduce the amount of overall wiring required. The control unit manages the switching traffic and can operate its own stored routines. In addition, an able-bodied user can switch or adjust an appliance within the home and the control unit will detect this and display modified status information to the disabled under when they next view the screen at any input station.

Control systems such as the one described above have a number of disadvantages: they require extensive wiring on installation which makes them difficult to retrofit into a new home; the presence of an input station in each room and the size of a TV screen is both costly and intrusive for other members of the family or guests; a new domestic appliance requires both wiring to the control unit and reprogramming of the microprocessor within the control unit such that the appliance can be identified and controlled from each input station; only one function on one appliance may be switched or adjusted at a time, particularly if the system is wired in series; any appliances which develops a fault has no means with which to send a message to the control unit that such a fault has occurred; in the event of mains power failure, the disabled user loses all control as emergency battery back-up is normally only found on essential medical equipment over which, for safety reasons, the disabled user has no day-to-day control and, if the control unit itself develops a fault, this can cause the entire system to become inoperable.

Because of the possibility of faults developing, most Health Authorities do not wholly rely on such control systems and, instead, use fulltime care assistance. In addition, these systems cannot determine if the disabled user is in difficulty unless they are capable of operating an alarm or telephone. Even in large residential homes for the disabled, such control system are not used due to the need for individuals to monitor faults occurring, for individuals to check on the well-being of the disabled person and the costs of installing a control system.

It is an object of at least one embodiment of the present invention to provide a communication and control system which obviates or mitigates at least one of the aforementioned disadvantages of existing control systems.

SUMMARY OF THE INVENTION

This is achieved by providing a wireless communication and control system which has at least two wireless communication modules, each wireless module having a processing unit which has an unique identification code. Each wireless communication module also has an unique hierarchical address corresponding to the identification code, the address defining the physical location and function of the wireless module. The hierarchical address represents at least two physical domains. Each processing unit has coupled to it a signal receiver or a signal transmitter or both a wireless signal receiver and a wireless signal transmitter, and at least one transducer for detecting a physical parameter and for broadcasting packets of data indicative of the status of a module or for controlling a remote module.

In a preferred embodiment, the wireless communication is radio-frequency (RF). For example, in response to a physical parameter being detected, such as temperature, one RF module, for example a heater, transmits a signal representative of temperature for reception by another RF module such as a control unit which can determine if the temperature is outside predetermined values and actuate an alarm or shut off the heater.

In a domestic environment, some RF modules may contain receivers only, e.g. television/video/lamps, some may contain transmitters only, for example temperature sensor modules but some contain both transmitters and receivers.

Thus, an RF module has both receivers and transmitters and, in response to a signal, to switch a lamp on in a physical location, the address of the lamp is first identified from the hierarchical address which is: the house address; the room address and the object address. The lamp is selected from a display using cursor controlled keys and, in response to a "select" signal, a radio frequency (RF) signal is broadcast for that lamp which receives the signal and its processing unit couples power to the lamp thus switching it on. Other objects may be similarly selected, for example, the heater, curtains, TV etc.

Because each RF module can have an RF transmitter, RF receiver or both, signals can be broadcast to other units within a transmitters range as appropriate, for example alarm signals. If the user is out or asleep, a temperature signal indicative of a fire can be broadcast to a telephone modem which may dial, automatically, the emergency services.

Each RF object or module has, in a preferred embodiment, an unique hierarchical address within a common packet address format. The packet address has a 2 byte identifying header (I.D.) followed by a send-to address (for example, 3 bytes); followed by a 3 byte sent from address, followed by up to 6 bytes of data and finally a single CRC byte.

Therefore, it will be appreciated that each object can have an unique ID in selection of 256 possibilities at each level of address. For domestic applications, the hierarchical address is based on three levels: a house (top-level); room (mid-level) and object (base-level).

The principal advantage of the above arrangement is that the control unit, or module sending a control signal, does not need to know the I.D. code or location of a module. This means that new modules can be used with an existing control unit and another control unit could also be used to control modules with minimal set-up.

According to a first aspect of the present invention, there is provided a wireless communication system having at least two physically separate communication modules, at least one module being coupled to an object for controlling the operation of said object, each communication module having a processing unit, each processing unit having an unique identification code and being programmable with a hierarchical address corresponding to said unique identification code to define the location and function of the object, and each module having one of a receiver, a transmitter or both, a transmitter and a receiver, coupled to such processing unit for sending or receiving a signal indicative of the status of the object coupled to at least one of said modules.

Preferably the unique identification code is a 48-bit electronic serial number. Alternatively, the unique identification code may be any other suitable electronic serial number. Advantageously, the 48-bit electronic serial number allows the hierarchical address to be programmed in each communications module. This is conveniently achieved by using a set-up device, for example, a lap-top, which sends a set-up/initialisation packet to each object. The 48-bit electronic serial number may also be encoded in a bar code secured to the module to allow each module supplied to be tracked for diagnosis, maintenance and the like.

Preferably, the communication system comprises a plurality of separate communication modules, one of said modules being a control module, the control module having at least one transmitter and at least one receiver.

Preferably, the communication system is a wireless communication system using radio-frequency and the communication modules are RF modules.

Conveniently, selected other modules of said plurality include wireless IR transceivers, as appropriate, with said control unit.

Preferably also, the control unit includes a display for displaying graphical icons of the objects to be controlled, and a user actuatable cursor for selecting an object icon.

Conveniently, the control module includes keys for controlling the cursor. Alternatively and/or additionally, the control module may include a joystick, a blow tube, a blank signalling system, a voice recognition system, touch screen display or the like, for a user to input cursor control commands.

Conveniently, the display is a liquid crystal display (LCD). Alternatively, the display may be CRT display.

The processing unit in each module is a programmable microprocessor. In the control unit the microprocessor is coupled by a serial bus to an I/O processor, the I/O processor coupling the bus to a plurality of peripheral devices, such as IR control and input means, such as a keypad, joystick or jack sockets for blow switches, and to an audio output control circuit.

The programmable microprocessor may automatically re-boot in the event of a fault occurring. Reporting means may also be included in the control unit so that when a fault occurs the control module transmits a signal, preferably by a telephone link, to a call centre/service centre to alert it of the fault. The telephone link may also be used to allow a user or service engineer to access remotely the microprocessor in the control unit for reprogramming, servicing or fault repair.

Further, the control module includes monitors for monitoring the well-being and performance of the control module. The monitors for well-being monitoring may be temperature and/or humidity sensors. The monitors for performance monitoring are event recorders which include storage means so that an audit trail is kept to log all commands and response of the control module and/or the other modules.

Additionally, the control module includes a loudspeaker. The loudspeaker may be used to relay an audible message when a command is entered on the control module. The audible message may be simply an audio tone signal or it could be a synthesised speech phrase.

The control module includes a panic button or command. The panic button may include means to operate all visual and audible signals in the control unit and the communications module. Additionally, the control system may include a siren which emits a signal when the panic button is activated. Preferably, the control system includes a strobe light The strobe light may be located on an outside wall of a user's home, so that the strobe light is activated in response to activation of the panic button it is clearly visible to passers-by The panic button is coupled to a position indicating switching, for example, a tilt switch, which may be located on a users wheelchair or on a pressure relief cushion so that the switch automatically generates a "panic signal" if the wheelchair tips over or the user falls off the cushion or is otherwise moved to a position where the tilt switch is actuated In addition, the panic button may also include means for relaying a signal through the telephone link to the care centre/service centre.

Preferably, the control module includes means to be powered from a main supply. Additionally, the control modules may include a battery pack with sufficient power to operate the system for a number of hours. The control module may also have the means to "power down" so that the battery power is conserved when the control unit is not in use. In addition, indicator means to display when the battery is low on power and may require to be replaced or recharged.

Each microprocessor includes memory means for storing a set of commands transferred or downloaded from the control unit. Additionally, each module includes at least one sensor, for monitoring faults in the module, such as overheating or humidity variations and a transmitter in the module for relaying monitored signals to the control module so that they may be used to alert the user, a carer or direct a further command to the appliance to which the module is connected.

In addition to relaying the signals from sensors within the module, the module includes means for transmitting signals from an object. These signals may be status signals for an object. More preferably, these signals are alert signals on which the user should react. For example, the signal may represent a door bell ringing on which the user should respond or the telephone ringing to which the user should also respond.

Although modules may including indicating means to signal the control module when the one or more batteries are low on power and may require to be replace or recharged. The control module may also have means to "power down" so that the battery power is conserved when the interface is not in use.

Each modules includes display means comprising at least one LED and a loudspeaker for relaying an audible message when the module receives or transmits a command.

Each module includes a mains power adaptor for use with a mains socket, the power adaptor including a socket for receiving the plug of an object for use on electrical devices. The mains power adaptor interface module includes a manual override facility such that the mains supply to the object can be controlled directly from the module.

A module may be coupled to mechanical door operating means which is controlled via the microprocessor of the module. This door operating module may further include a loudspeaker and a microphone which may be used by a visitor to communicate with the user.

Preferably, each module includes at least one programmable relay switch which has mains power switching capability.

A communication module may also be included in a telephone and/or intercom unit. The telephone module may operate as a standard telephone or be operated remotely from the control module. The control module may also store telephone numbers and display these for the user to select. On selection of a telephone the control unit automatically dials the number.

The telephone module may also include a headset for the user to wear.

Preferably, there are a plurality of telephone modules are accessible by the control modules, all of which may include intercom units to allow the user to speak to individuals in other rooms throughout a home when a telephone module is placed in the respective room where the individual is located.

Preferably, the control system further comprises at least one override device similar to the control module which may be used by the carer, said override device including an unique encoded address such that the signal transmitted from the control module can only be received by the override device.

Conveniently, the override device includes a pager which may be activated from the control module or any other module.

According to another aspect of the present invention, there is provided a method of communicating between at least two communication modules of a wireless communication system, each communication module having a programmable processing unit and an unique identification code for the processing unit, said processing unit being coupled to an object for controlling the object or indicating the status of the object, said method comprising the steps of:

assigning a hierarchical address to each module corresponding said unique identification code, said hierarchical address corresponding to the physical location and function of said module, programming each module with said hierarchical address, each module responding to a wireless signal containing the hierarchical address of the object to control the object to generate a signal containing the address of object to indicate the status of the object.

Conveniently, the method is applicable to communication between a plurality of communication modules with a transmitted signal being broadcast to all wireless modules but only received by the module with the desired hierarchical address.

Preferably, the wireless communication method is performed using RF (radio-frequency) communication.

Preferably, the method includes the step of generating control signals from a control unit in response to user selection for broadcasting said control signals to selected modules for controlling said objects coupled to the modules or for obtaining the status of said modules.

According to another aspect of the present invention, there is provided a communication module for use in a wireless communication system having at least two wireless communication modules, said communication modules being adapted to be coupled to an object for indicating the status of the object or controlling the functions of the object, said communication module having a programmable processing unit having an unique identification code and being programmable with a hierarchical code corresponding to said unique identification code and being indicative of the physical location and function of the module, and each said module having one of a transmitter, a receiver or a transmitter and a receiver for broadcasting information about the status of the object or for receiving a signal addressed to the module for controlling a preselected function of said object.

Preferably, the wireless communications module is incorporated into a control module for broadcasting control signals, each broadcast control signal containing an address for a wireless communications module, said control unit having a display coupled to said processing unit for displaying details of each object to be controlled, user input control means coupled to the processor for selecting an object in said display, interface means coupled to said processing means for receiving a control signal from said processing means and for converting said signal to a broadcast signal with an address of a communications module for receiving said broadcast signal.

Preferably, the communication module uses radio-frequency (RF) and the control module includes a RF transmitter/receiver processor. The control modules may include an IR transmitter/receiver processor.

The control module may also have an audio output to generate audio speech.

Most conveniently, the control unit is dimensioned and proportioned to be hand-held and has a LCD display and user operable keys for selecting graphically illustrative icons corresponding to objects coupled to communication modules in a physical location. Alternatively, the keys may be replaced by a joystick or blow switches. The control unit is conveniently battery powered and includes a battery charging unit allowing it to be recharged from the mains supply.

According to a fourth aspect of the present invention, there is provided a wireless communication and control system for remotely controlling the operation of a plurality of objects in a domestic environment, said wireless communication and control system comprising:

a wireless communications control unit having a display and user input means for inputting user commands to the control unit, a microprocessor disposed in said control unit for executing input signals and providing output signals, said microprocessor being coupled to said display and to an output interface, said wireless control unit having a programmable address, the display being controllable by said microprocessor to display a list of objects to be controlled from said wireless control unit, an object from the list being selectable by a user via said user input means, a plurality of separate remote communication modules each coupled to an object to be controlled or from which status is required, each remote communication module having a microprocessor and an unique identification code and a corresponding hierarchical address corresponding to the identification code and defining the physical location and function of the object in said domestic environment and one of a wireless receiver for receiving control or status signals, a wireless transmitter for transmitting control or status signals, or a wireless transceiver for receiving and transmitting control and status signals, the arrangement being such that in response to a user input, at least one object to be controlled is selected from the display and a control signal broadcast from said wireless control unit, said wireless broadcast signal containing at least one hierarchical address of said object or objects to be controlled, said address having a first code portion identifying the location of said at least one object by at least two hierarchical levels, a second code portion identifying the control unit by said at least two hierarchical levels, a data code portion containing control information for operating said object and a check code portion for checking the integrity of said control signal, the remote wireless communication modules with at least one address matching said first code portion responding to said broadcast control signal and operating said at least one object in accordance with information contained in said data code portion.

Preferably, the communication system uses radio-frequency (RF) communication modules.

According to a fifth aspect of the invention, there is provided a method of operating a plurality of remote devices from a control unit using the wireless communication system according to the fourth aspect of the invention.

Preferably, the method further includes the step of transmitting a confirmatory signal from the object module to the control unit to confirm that the command has been received.

The method also includes the steps of changing the status of a visible indicator or audible indicator on the object module when the command has been received by the object module.

The method further includes the steps of providing the user with a visible or audible indicator via the control unit that the command has been received at the object module and that the appliance is operating according to the command.

Preferably, the method also includes the steps of continuously polling of all the object modules in the system by the control unit to check the status of each object.

More preferably, the method includes the step of transmitting a failure signal from an object module to the control unit in the event of failure or unexpected changes in operating status of the object.

Additionally, the method also includes the steps of programming a set of commands into the microprocessor of the control unit and downloading the program of commands to a selected object module to respond to said commands at pre-programmed times or time intervals.

In the event that the interface module is out of range of the control unit, the method includes the step of broadcasting the command signal to all object modules and said object modules re-broadcasting the signal to all modules. This step is repeated until the interface module including the address in the command signal receives the command signal.

According to a sixth aspect of the present invention, there is provided a method of remotely operating an object connected to a wireless communications module of a wireless communications control system, the method comprising the steps of:

connecting a system telephone to said wireless communications module to be controlled;

dialling the system telephone from a further telephone at a remote location, said further telephone having a keypad;

entering a password on the keypad of the further telephone to gain access to the control system;

entering an address code on the keypad of said further telephone for the wireless communication module coupled to the object to be controlled;

entering a command code for the keypad of the further telephone for operating said object;

transmitting a command signal including the hierarchical address of said object from the system telephone said hierarchical address defining the location and the function of the object;

receiving the command signal at the object communication module and decoding the hierarchical address in the signal, and operating the object in accordance with instructions in the command signal.

Preferably, the communication system is radio-frequency controlled and the communication module is an RP module.

Preferably, the method further includes the steps of transmitting a confirmatory signal from the object RF communication module to the telephone communications module to confirm that the command signal has been received, and transmitting the confirmatory signal in an audible signal to the further telephone at the remote location.

Additionally, the method further includes the step of relaying status information about an object to a further telephone at the remote location so that the product can be monitored.

In all of the above aspects of the invention the hierarchical address can be unique or non-unique. An example of an unique address is an unique or sole object, for example, a VCR, and a non-unique address is a non-unique object, such as a lamp. A room may contain two or more lamps which may require to be switched individually using an unique address or collectively using a non-unique address.

BRIEF DESCRIPTION OF THE DRAWINGS

These and other aspects of the invention will become apparent from the following description, when taken in combination with the accompanying drawings, in which

FIG. 2c is a view similar to FIGS. 2a,2b showing a detailed graphic display for remotely controlling the video cassette recorder (VCR) shown on the screen of FIG. 2a;

DETAILED DESCRIPTION OF THE PREFERRED EMBODIMENTS

Figure 1:
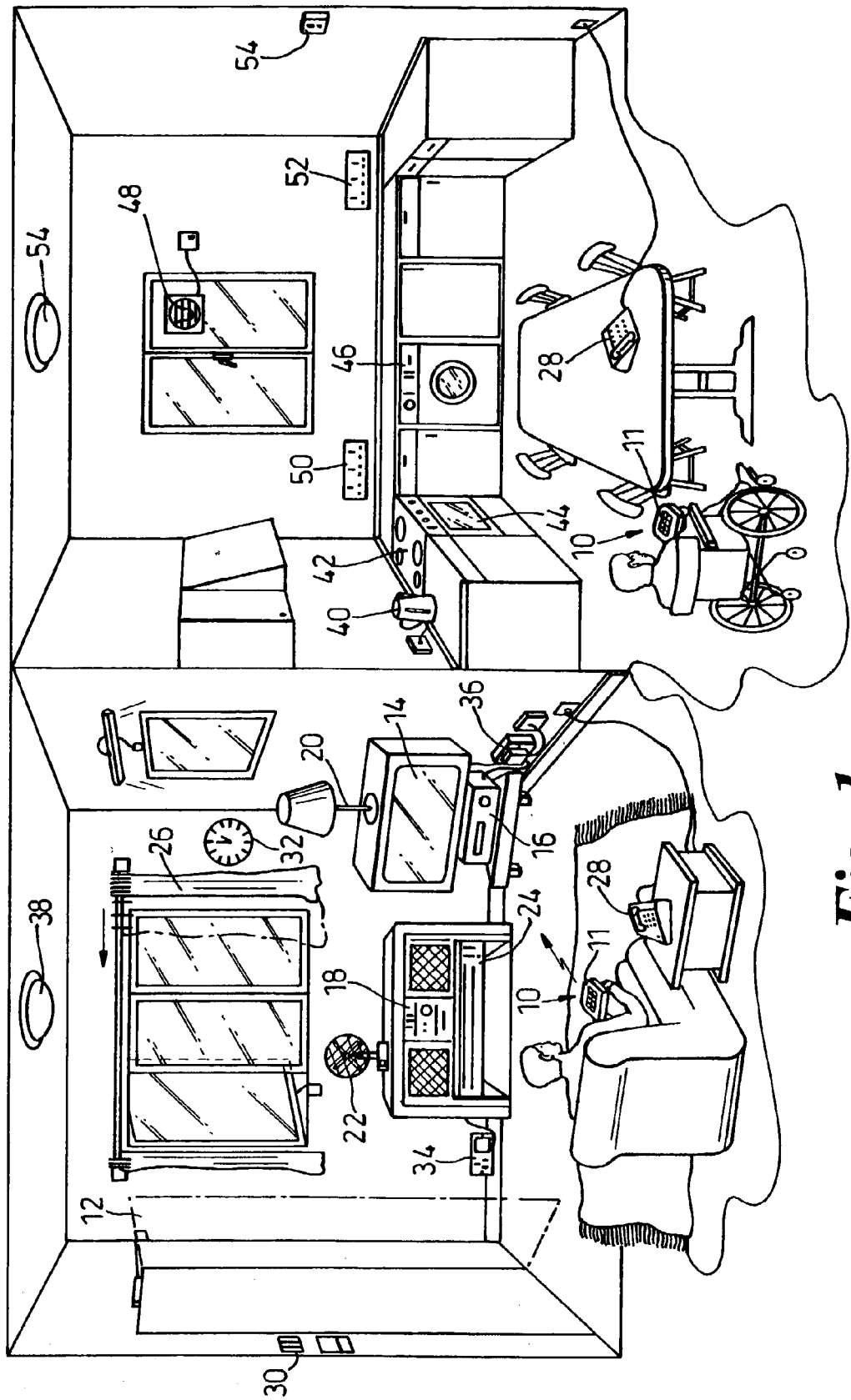
FIG. 1 is a perspective view of part of two rooms in a domestic environment in which a communications control system in accordance with an embodiment of the present invention is located.

Reference is first made to FIG. 1 of the drawings which depicts a perspective view of part of two rooms in a house fitted with communications modules and a control system for operating a variety of appliances and devices in accordance with an embodiment of the present invention.

In the left room shown in FIG. 1, the lounge, a seated user has a control unit, generally indicated by reference numeral 10, in his lap. The control unit has a keypad 11 which allows the user to generate control signals for controlling a variety of items, such as a door 12, a television 14, a VCR 16, a HiFi 18, a lamp 20, a fan 22, a heater 24, curtains 26, a telephone 28, a room intercom 30, a clock 32, sockets 34,36 and a room light 38.

The rightmost picture of FIG. 1 shows a wheelchair seated user with a control unit 10 in his lap for controlling a variety of appliances in a kitchen, such as the telephone 28, a kettle 40, a cooker 42, oven 44, a washing machine 46, an extractor fan 48, worktop sockets 50,52 and a room light 54.

The way in which each of the items listed above is controlled by the control unit will be later described in detail. Control of each of the items/appliances is achieved in the same way by the control unit. As will be also later described, the control unit 10 generates a control signal which is received by an intelligent module associated with each of the appliances to be controlled. The control unit transmits an unique hierarchical address, called a domain address for each item, which is in the form of "house.room.object" and this address takes is a separate numerical code which provides an unique address for each item/appliance, as will be later described in detail.

Figure 2A:
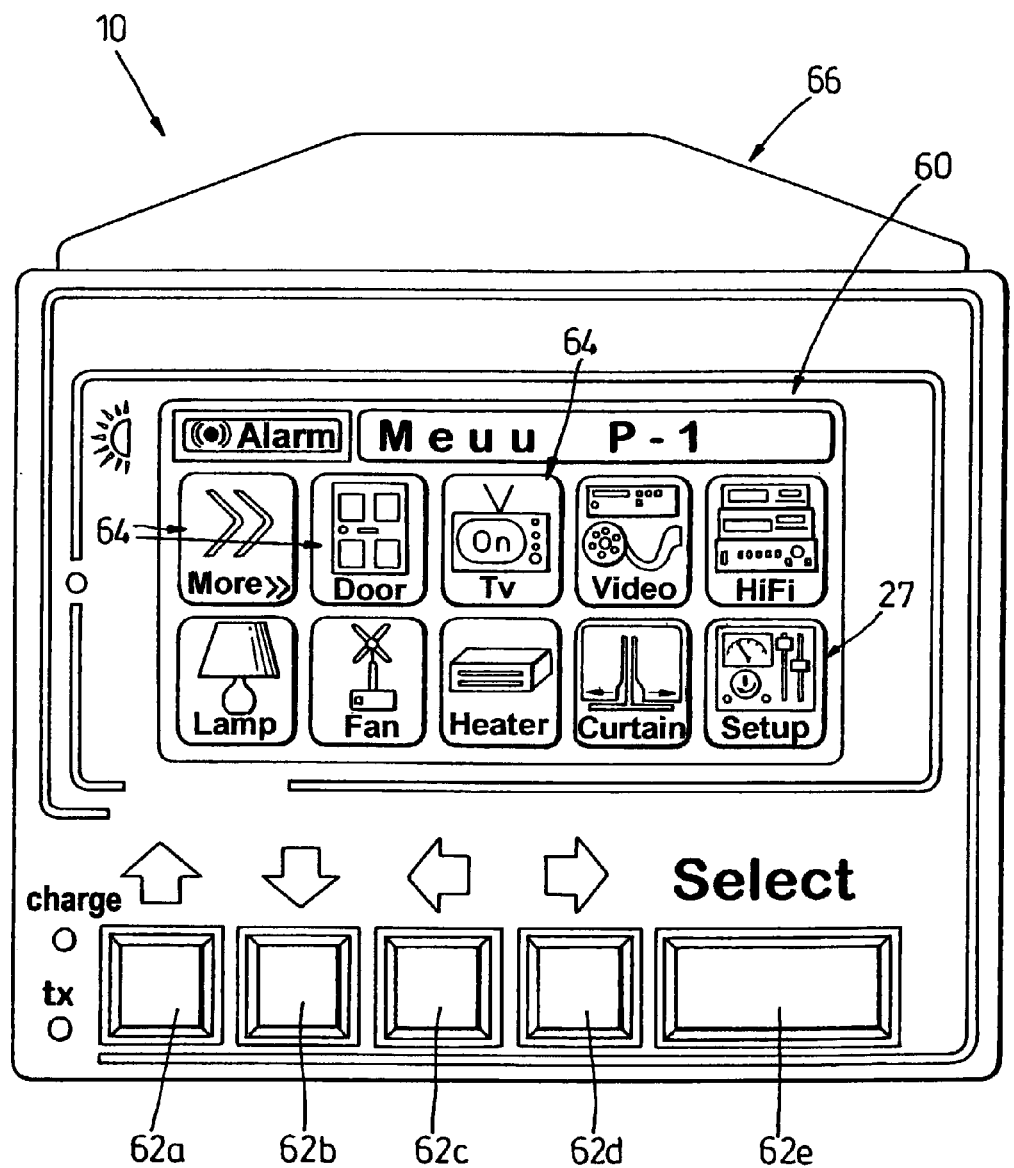
FIG. 2a is a plan view of a control unit for use in the system of FIG. 1 depicting a graphic display screen of objects to be controlled.
Figure 2B:
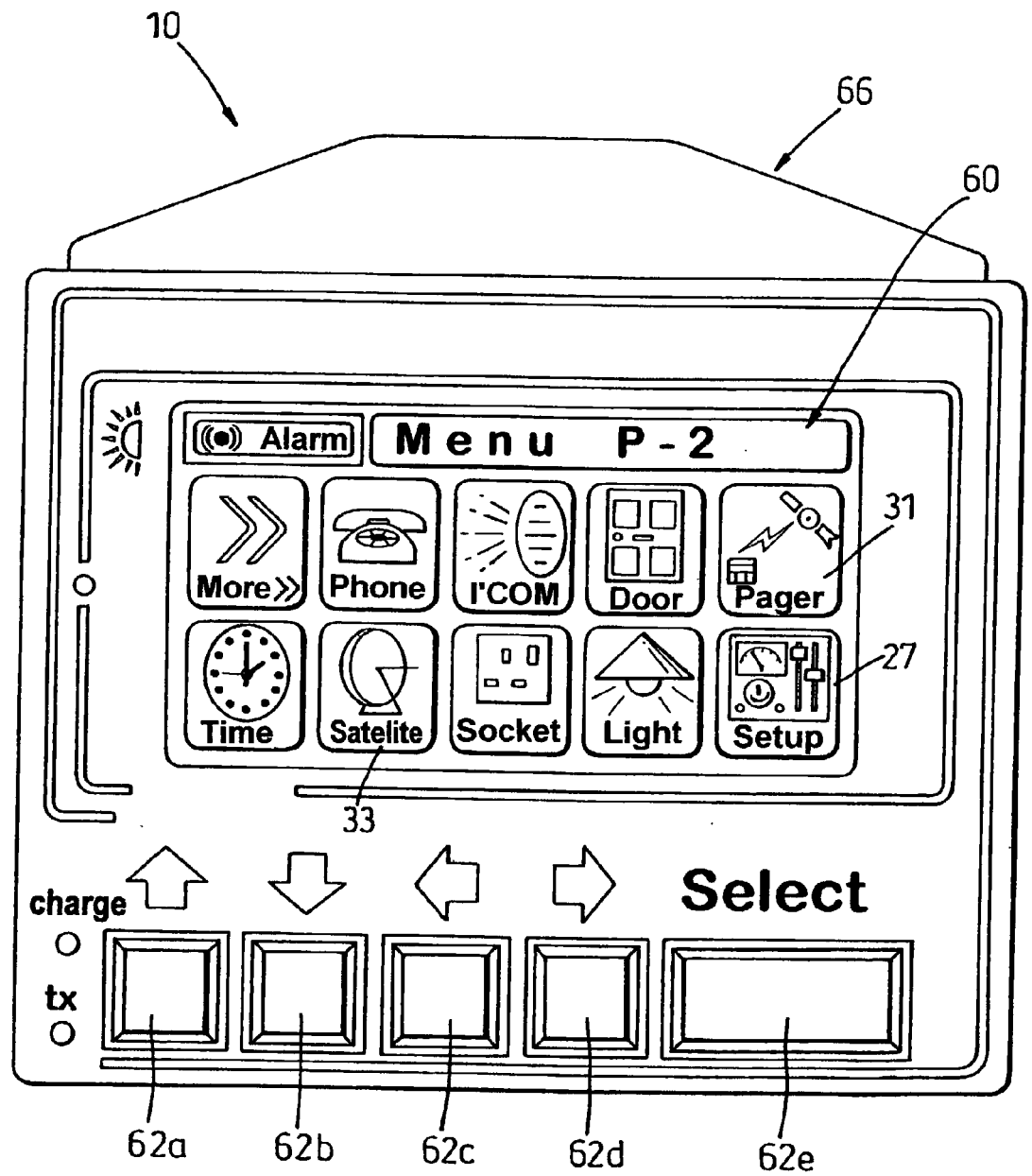
FIG. 2b is a view similar to FIG. 2a of a different graphic screen for controlling different objects.
Figure 2C:
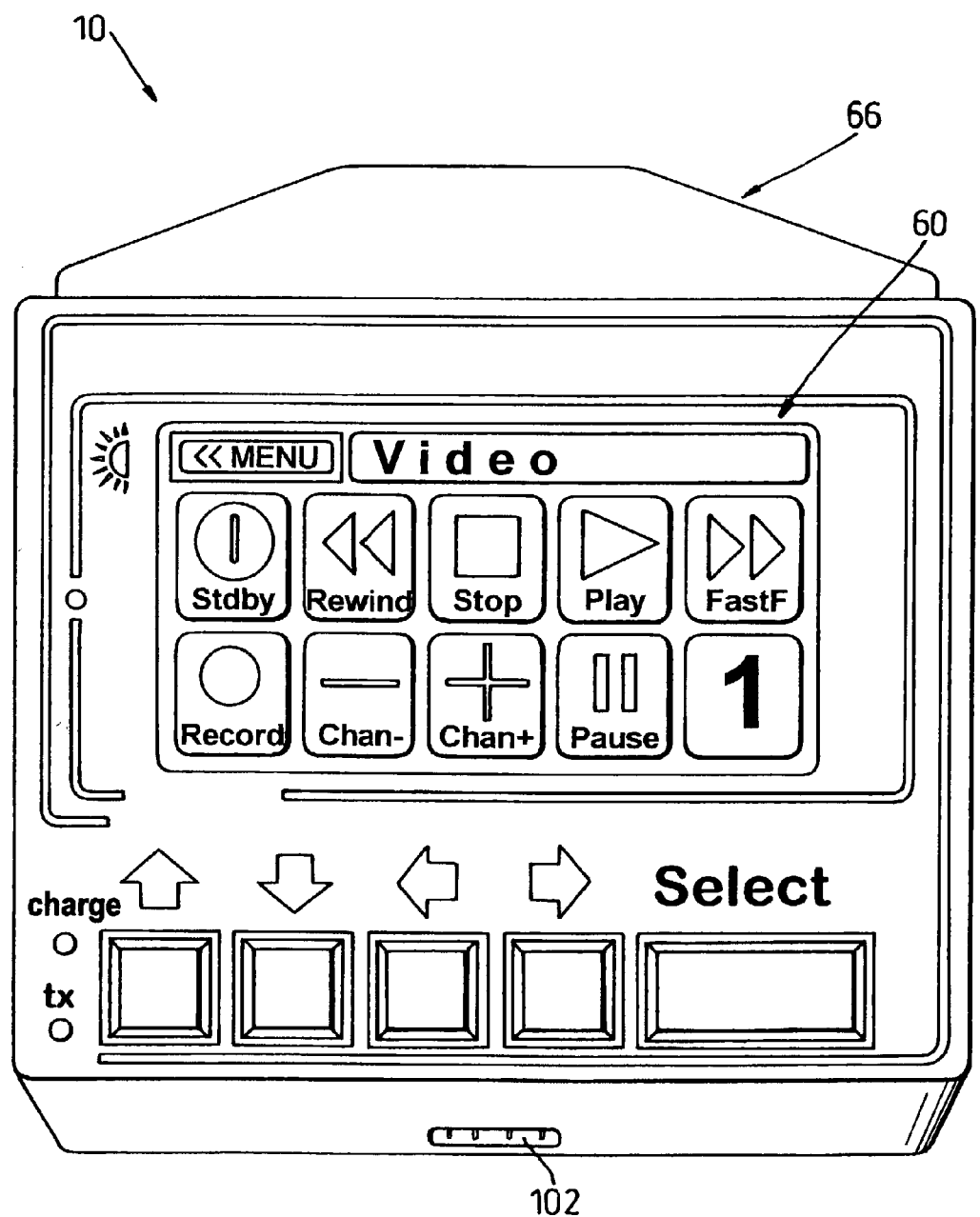

Reference is now made to FIGS. 2a, 2b and 2c of the drawings. These figures show the top view of the control unit 10 and it will be seen that the control unit is generally square in plan, although this can be of any suitable shape, and contains a liquid crystal display screen 60 and a plurality of control buttons, generally indicated by reference numerals 62a,b,c,d and e. Buttons 62a–d provide cursor direction control and button 62e selects a screen icon representing an item to be controlled.

The screen display 60 depicts a plurality of icons 64 representative of each of the appliances to be controlled. Referring first to FIG. 2a, it will be seen that there is an icon for each of the appliances to be controlled, such as the door 12, television 14, VCR 16, HiFi 18, lamp 20, fan 22, heater 24 and curtains 26. It will also be seen that there is a set-up icon 27 which allows the user set up system variables, such as screen contrast, input device type, pre-set time, volume controls, cursor speed control etc. Each communications module in each item has a set of specific system variables which, depending on the module, define the modules operating parameters, for example, temperature and brightness of a lamp. The system variables can be written to, and read from, any other module including a telephone module controlled remotely by a carer. The variables differ between different modules for different types of object.

FIG. 2b depicts a further screen display 60 which depicts further icons for the telephone 28, intercom 30, a further icon for the door 12, a pager 31, an icon for the clock 32, satellite 33 and socket 34 and light 36. Additional screen displays can be provided depending on the number of items/appliances to be selected in a particular environment and this can be adjusted at set-up Reference is now made to FIG. 2c of the drawings which depicts a further screen display on the control unit 10 which is presented to the user when the keys on FIG. 2a are used to select the VCR 16. It will be seen that the screen display 60 provides icons for certain video control functions, such as standby, rewind, stop, play, fast-forward etc. Icons are also presented so that the user can select between channels (channel+ and channel−) and the user can also pause the VCR. All of the usual video control features are present and can be controlled from the control unit 10.

The control unit 10 also has a infrared generator and detector, generally indicated by reference numeral 66, from which infrared signals can be transmitted and received, as will be later described in detail, so that control signals containing unique addresses can be generated to the respective item/appliance which is desired to be controlled, for example whether to open or close curtains or to watch a particular video channel.

Figure 3:
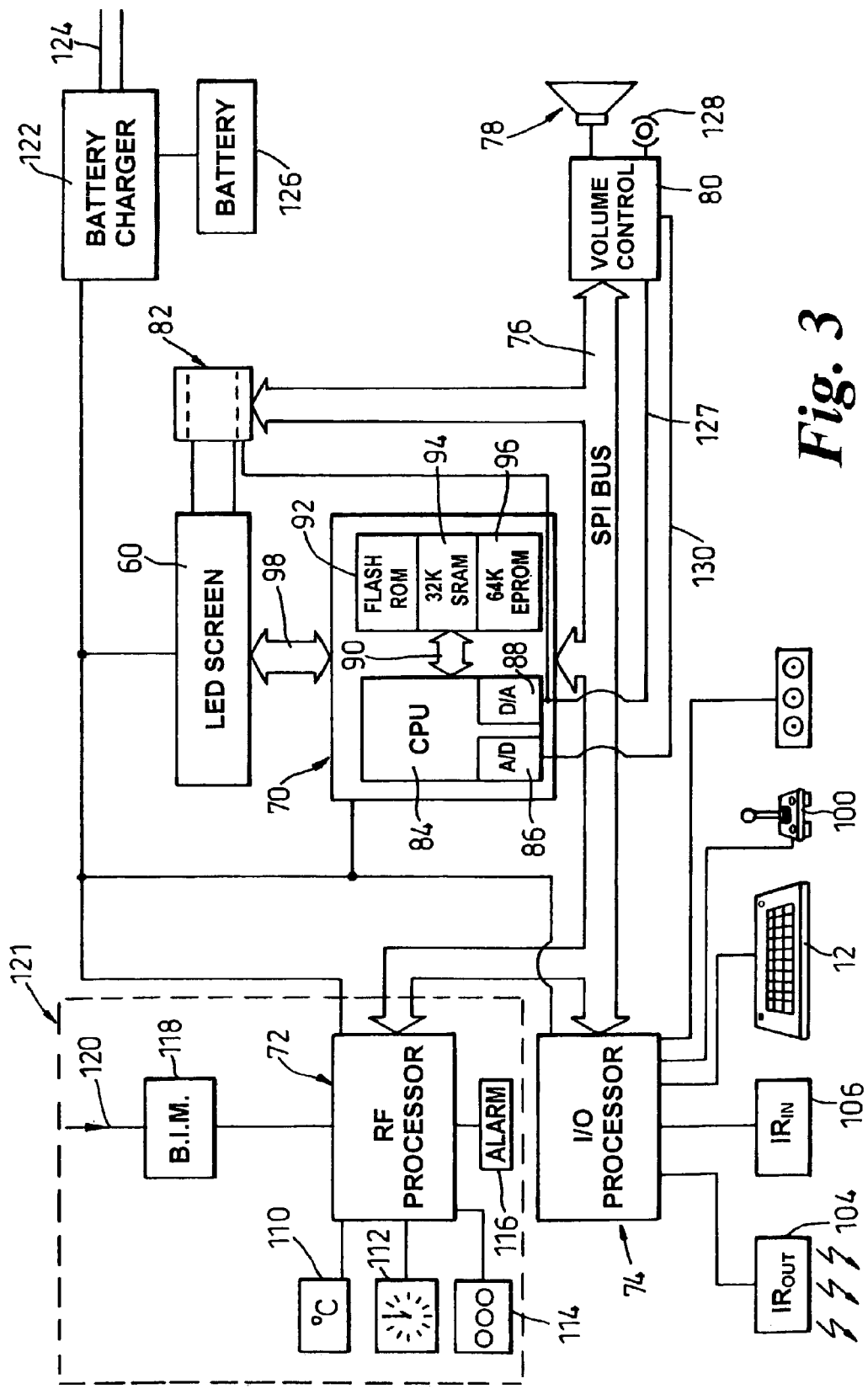
FIG. 3 is a schematic block diagram of the control unit in accordance with an embodiment of the present invention.

Reference is now made to FIG. 3 of the drawings which depicts a schematic block diagram of the control unit 10 in accordance with the embodiment of the present invention. The control unit circuitry is based around a central processing unit, generally indicated by reference numeral 70, which is coupled to a RF processor 72 and an I/O processor 74 by a high speed serial SPI bus 76. The serial bus 76 is also coupled to a loudspeaker 78 via a volume control 80 and to a LCD contrast and brightness control unit 82 which controls the 240×128 element LCD screen 60.

The central processing unit 70 has an 8 bit Mitsubishi 37451 microprocessor 84 which contains an A to D converter 86 and a D to A converter 88. The CPU 84 is connected to three memory elements 92,94 and 96 via a local bus 90 which has sixteen address lines and eight data lines, the memory unit comprising a 1 megabyte flash ROM 92, a 32K static RAM 94 and a 64K EPROM 96.

The CPU 84 communicates with the LCD screen 60 via bus 98 to address the individual LCD elements for displaying the screen icons and information as shown on the screens in FIGS. 2a, 2b and 2c.

The I/O processor 74 of the control unit 10 is attached to a number of elements; the keypad 12 which contains keys 62a,b,c,d and e as shown by which the user can input commands to the control unit 10; a joystick 100 which is coupled via a joystick port 102 (shown in FIG. 2c) by which a user can select the displayed icons by pressing an appropriate button on the joystick 100; an infrared output transmitter 104 contained in housing part 66, (shown in FIGS. 2a, 2b and 2c) and an infrared input 106 by which is the I/O processor 74 can receive infrared signals from any of the communication modules or from another control unit.

The RF processor 72 is also coupled to a plurality of units for providing information to the control unit 10 and which may be transmitted to a remote communications module. The RF processor is coupled to a digital thermometer 110 which contains the unique 48-bit electronic serial number of the control unit. The unique 48-bit electronic serial number provides an initial address for the module or control unit. This allows the hierarchical address to be programmed by a programmer or the like using a set-up device, for example, a lap top computer which sends an invitation packet to each module to create the hierarchical address corresponding to the unique identification serial number. The RF processor is also coupled to a real-time clock 112, a plurality of light emitting diodes (LEDs) 114 disposed in the control unit housing for providing information about the status of the control unit, such as whether the battery is charged or whether the unit is in transmit/receive mode and an alarm unit 116 such as a mercury tilt switch which may be disposed in a user's chair or wheelchair.

The RF processor is also coupled to BIM (bought-in-radio module) 118 (Part 418F, Radiometric) which is, in turn, coupled to a helical antenna 120 through which RF control signals may be transmitted and received. The RF processor 72 and units 110,112,114,116 and 118 form a communications module 121 within the control unit 10.

The control unit 10 also contains a battery charger 122 which is adapted to be coupled to an external AC power source 124 for charging a DC battery 126 and for providing power to the LCD screen 10, the CPU core 70, the RF processor 72 and the I/O processor 74.

The A/D converter 86 and the D/A converter 88 of the microprocessor 84 are connected to the volume control chip 80 which also receives data from the SPI bus. The D/A converter provides a control signal on line 127 which is coupled to the loudspeaker 78, such that control information may be audibly given, to the visually impaired for example. Similarly, the volume control may contain a microphone 128 for receiving audio information and for transmitting this audio information on control line 130 to the A/D converter 86 within the microprocessor 70.

Thus, with the control circuit shown in FIG. 3 information can be presented to a user either visually via the LCD screen 60 or audibly via loudspeaker 78. The I/O processor 74 allows control of the control unit 10 to be achieved by either a keypad 12 or a joystick 100 and the control unit may transmit control information either by infrared (IR) or by radio frequency (RF) using the RF processor and BIM 126 and helical aerial 128. The unit may be mains powered via the AC input or battery powered via the battery charger so to allow freedom of use for mains connection.

Figure 4:
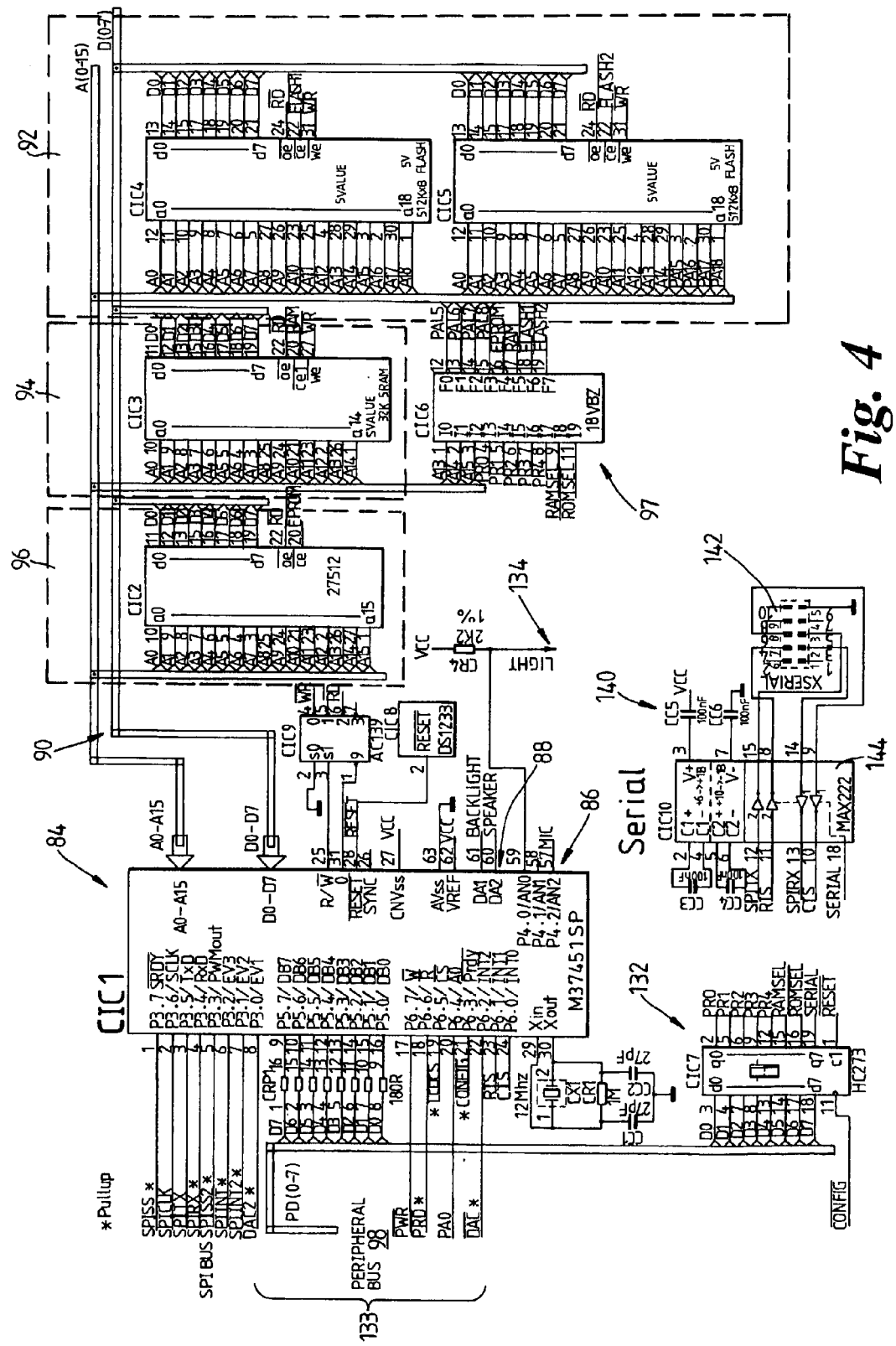
FIG. 4 is a circuit diagram of the central processor unit, the RF processor, I/O processor and other components of the control unit shown in FIG. 3.

Reference is now made to FIG. 4 of the drawings which depicts the core CPU 70 shown in FIG. 3 in more detail. The core CPU has the 8 bit Mitsubishi 37451SP microprocessor 84 which is coupled to the 1 megabyte flash ROM 92, the 32K static RAM 94 and the 64K EPROM 96 by the high speed SPI bus 76. The SPI bus contains 16 address lines (A0–A15) and eight data lines (D0–D7). A glue logic chip 97 is used to couple the EPROM, the SRAM and flash ROMs together.

The microprocessor 84 has the three-input A/D converter 86 and the two-line D/A converter 88. The microprocessor 84 is also coupled to the peripheral bus 98 which contains eight data lines (PD-0-7) which are coupled to control the LCD screen display and to a page register 132 for management of memory pages. Outputs 133 are used to control the LCD screen display 60. Microprocessor inputs 1 to 8 are coupled to the SPI bus 76 which are coupled to the LCD brightness/contrast controller 82, the RF processor 72 and I/O processor 74 as shown in FIG. 3. The A/D converter 86 has an output 134 which is coupled to a light sensor and has a microphone input pin whereby it can receive an input from the microphone 128 shown in FIG. 3.

Also shown in FIG. 4 is a serial test port 140 which has an input socket 142 and a control chip 144. The serial test port 140 allows the control unit 10 to be interrogated once an interrogation unit is plugged into the socket 142 to ensure that all of the operations are performing properly.

Figure 5:
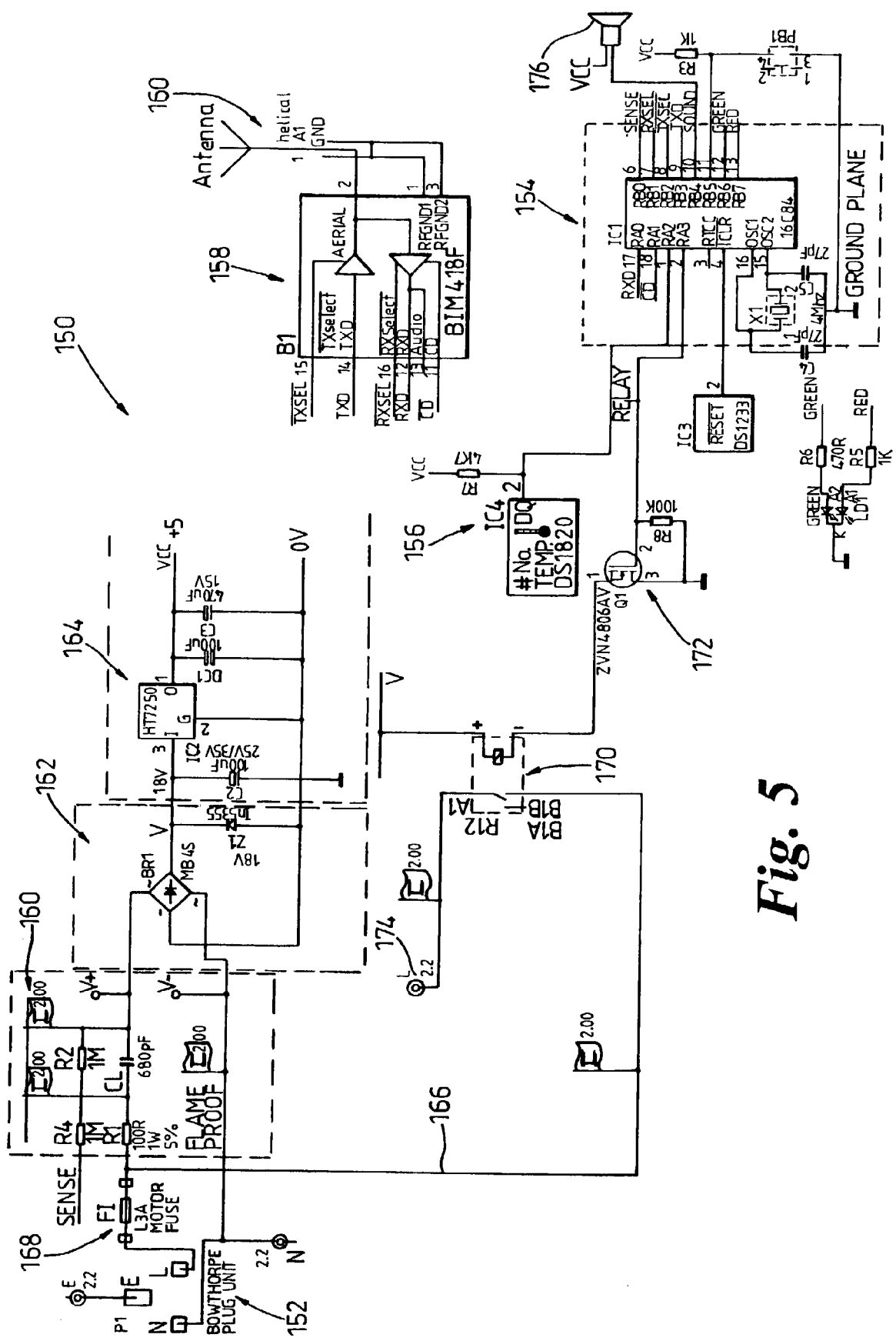
FIG. 5 is a circuit diagram of a plug module for controlling a lamp for use with the control circuit shown in FIGS. 1 to 4.

Reference is now made to FIG. 5 of the drawings which depicts a circuit diagram of a communications module 150 for controlling the lounge lamp 20, shown in FIG. 1, when used with the control unit 10. It should be understood that the lamp 20 has, in the U.K., a three-pin plug (not shown in the interests of clarity) which plugs into a socket 152 which is part of the communications module. The communications module 150 is powered to receive a signal transmitted from the control unit 10 with address information for the lamp 20 to perform a particular function, for example to switch ON, or to switch OFF. The communications module 150 consists of a central processor (CPU) node 154 which is coupled to a temperature sensor 156 which also has an unique 48-bit electronic serial number (in this case DS 1820). The 48-bit serial number has a corresponding hierarchical address which is programmed into the node, as will be described, and which is used to identify and control the node function, in this case switching the lamp ON or OFF.

The CPU node 154 is coupled, via chip various outputs, to a Radiometric radio module BIM 418F (indicated by reference numeral 158), similar to that shown in FIG. 3 of the drawings. The radio module 158 has a helical antenna 160 for receiving RF signals generated by the control unit 10 and the output of the module 158 is fed to the CPU node 154.

Power is supplied to the CPU node 154 and module 158 from the AC supply via the socket 152. AC power is passed through a reactive dropper 160, a zener and rectifier circuit 162 and a voltage regulator 164 which provides a +5 and zero volt output which is used to power the electronic components in the communications module 150. The live output 166 from the fuse 168 is provided to form the live input of a relay 170. One side of the relay is coupled to a relay driver 172, the input of which is coupled to an output from the CPU node 154.

In use, when it is desired to switch the lamp 20 ON or OFF and the lamp 20 is plugged into the socket, the control unit 10 sends an identification address which is received via the antenna and Radiometric module 158 and conveyed to the CPU node 154. The control signal may be, for example, SWITCH LOUNGE LAMP ON. The address is transmitted to the CPU node 154 and a control signal is sent to relay driver 172 which switches on and allows a current to pass through the relay 170 closing relay contacts within the relay 170 and allowing the live line 166 to be connected to the live output 174 which is connected to the lamp 20, thereby switching the lamp 20 ON, the lamp return being connected to the neutral line. In this way the lounge lamp 20 is switched ON and OFF remotely by the control unit 10 operated by a user. The temperature sensor 156 provides a signal to the CPU node 154 if the temperature exceeds a predetermined threshold value. When this occurs the CPU node 154 sends a signal via the Radiometric module 158 which is received by the control unit 10. The control unit 10 would log a fault and would broadcast the fault condition via the telephone network, a central fault logging computer or network (not shown). The lamp may also be switched off automatically if the temperature is too high and/or an alarm can be actuated via loudspeaker 176 via an output from the CPU node 154 on the "sound" output line.

Figure 6:
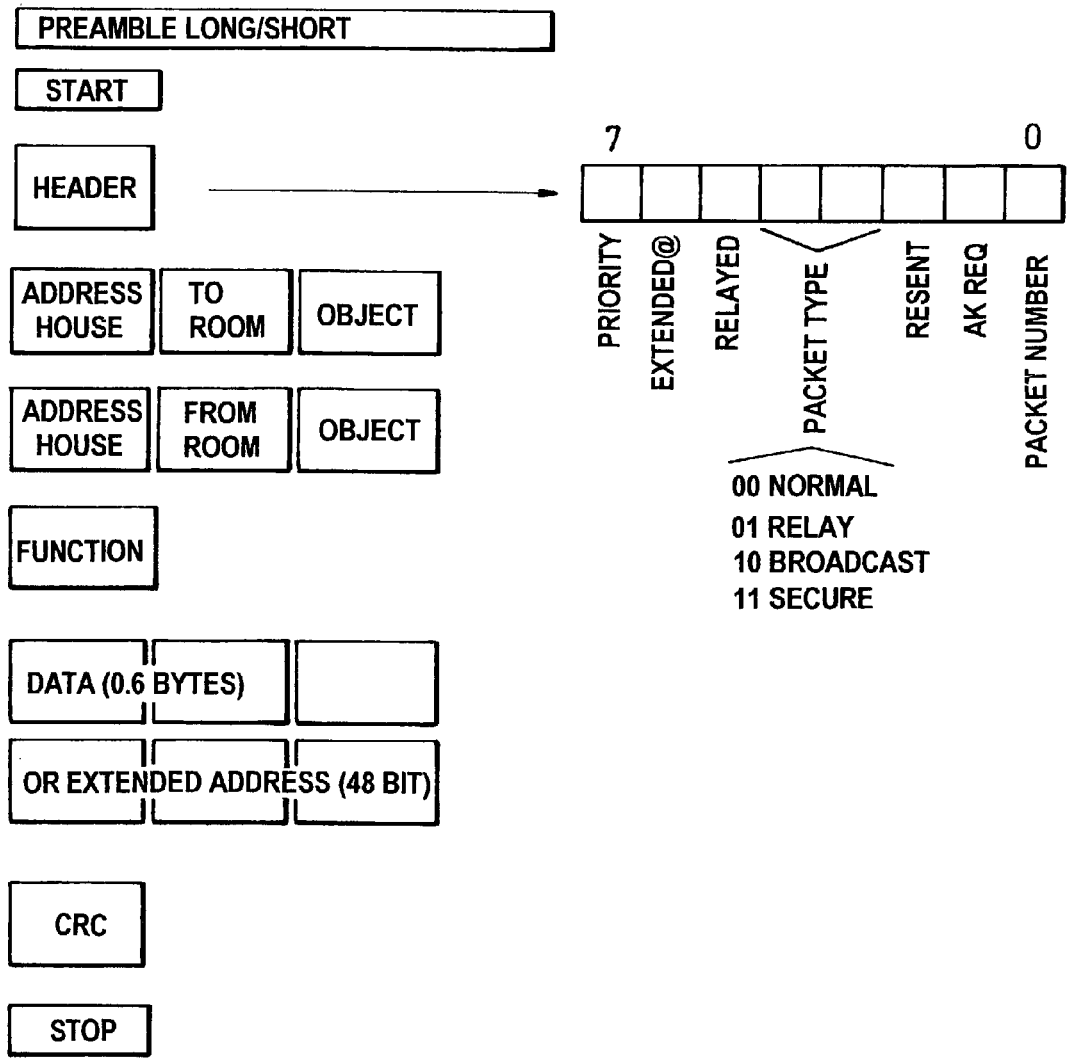
FIG. 6 is a schematic diagram of a hierarchical address packet format used with the communications system of FIGS. 1 to 5.

Reference is now made to FIG. 6 of the drawings which contains details of the packet format and addressing which is used to transmit information between the control unit and the communication module and also between communication modules for the control system described herein. This type of addressing is known as an Object Oriented Hierarchical Addressing System. As described above, each module or "node" within the home network is assigned, at installation, an unique domain address. This is by a lap-top computer assigning the domain address to the electronic serial number for the node or module. This initialises the module and the domain address is thereafter used to identify, control and receives signals from the module. This unique address describes both the function and the location of the node. The address of each node is of the form:

House.Room.Object

The first part of the domain address "house" identifies the housing containing the node. Normally the customer ID is provided by the supplier and is optional. If the house ID is missing, the system assumes it to be the ID of the sending unit. For example, "Johnshouse" may be represented by 123356.

The term "room" determines the room in which an object to be controlled is located. For some portable objects, for example the controller, there is differentiation between multiple nodes; that is, main.controller, secondary.controller. If this domain address is missing, it is assumed to be current room in which the node is located.

Examples of room addresses are:
kitchen; lounge; all rooms or main; secondary or carer.

The term "object" defines both the object and the function of the object. For example, the following objects are used:

lamp; television; VCR; controller; heater, and ALL OBJECTS.

Examples of addresses which are used are:
Johnshouse.kitchen.lamp—the lamp node in Johnshouse
1234. study.fan—the fan node in customer 1234's study
Johnshouse.main.controller—the main controller in Johnshouse.
1234. lounge.all objects—all nodes within the lounge
kitchen.light—kitchen lighting node in 1234 house (assumed house).

Details of the packet format and addressing will now be described and then how a lamp is switched on using specific addresses. The packet details are best seen in FIG. 6 of the drawings.

The format of a packet consists of a preamble, a start, followed by a header and then followed by the domain address, function and data on extended address plus a cyclic redundancy check (CRC) and then lastly, a stop signal. An explanation for each of the elements shown in FIG. 6 is given below:

Preamble Sequence to prepare Receiver for reception
Start Start Bit to mark the start of the packet
Header Packet header defines purpose of packet
Priority Set if High priority packet (long preamble)
Extended@ The 48-bit unique serial number is contained in the Data field and used as the "address to".
Relayed Set if the packet has been relayed by another node in the network
Packet Type
Normal—Normal Packet
  Broadcast—Packet is repeated by all receiving nodes
  Relayed—Packet is received and repeated by the designated relay node
  Secure—Packet needs a secure replay
  Resent—Packet is copy and has been resent
  AkReq—Acknowledge request. Receiving node must acknowledge receipt of packet
  Packet Number—Toggle for packet duplicate protection
Address to Node domain Addresses e.g. myhouse.kitchen.lamp
Address from FN Function for to node to perform e.g. On, off, temperature
Data
Data for function e.g. FN-Temperature Data=27.2° C.
  Or contains 48 bit address (unique Electronic Serial Number) or node to address. Used in setting up Node domain addresses
CRC 8 bit polynomial CRC $X^8+X^5+X^4+1$ of all packet including addresses.

The packet which is used is based on a standard format as disclosed in the ISO 7 layer communications model which is well known to a man of ordinary skill in the art.

It will be seen that the header is 8 bits wide and 2 of the bits are used to identify the packet type, whether normal, relay, broadcast or secure. Other bits indicate whether it is a short packet or whether it is being resent and is therefore a copy.

Figure 7:
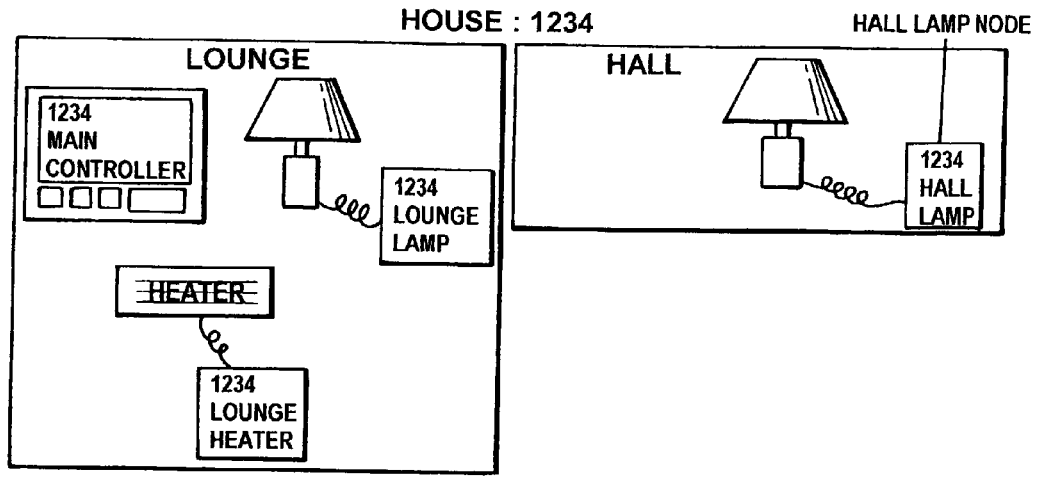
FIG. 7 is a schematic diagram of an address packet broadcast from the control unit to control a hall lamp.
Figure 7:
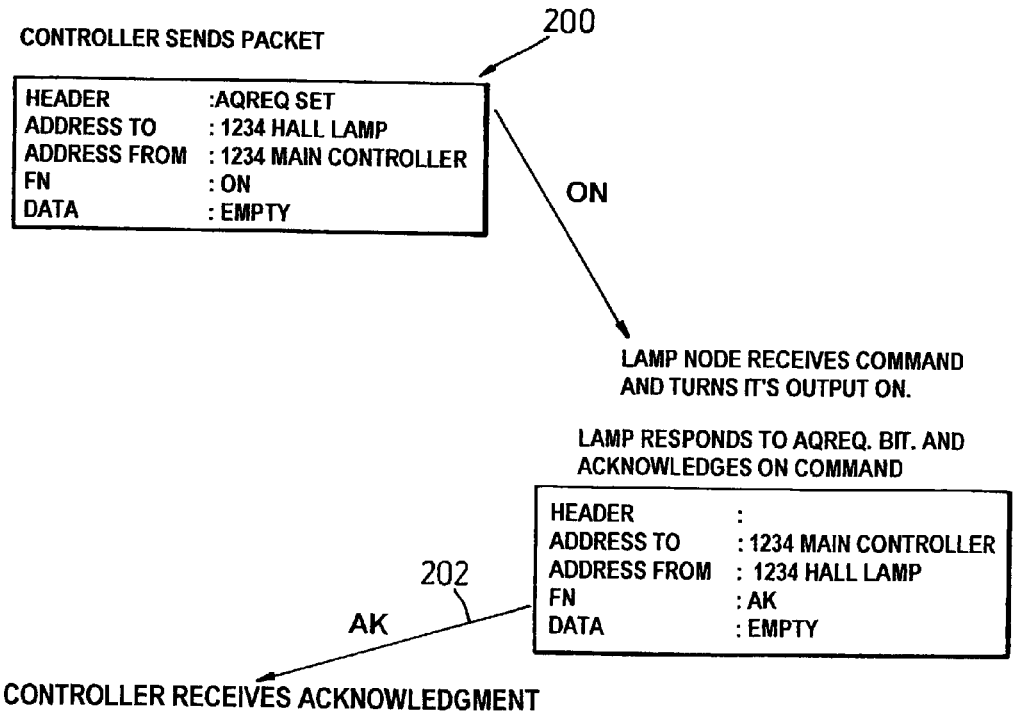

Reference is now made to FIG. 7 of the drawings which depicts, schematically, how a command "turn hall lamp on" would initiate a particular packet communication. In FIG. 7 it will be seen from the diagrams at the top of the sheet that a lamp located in the lounge and in the hall. Both the lounge and the hall lamp have the same house address, that is 1234, and this is represented within the domain address for each lamp. The controller or control unit has an address (address 1234. main.controller) and the lamp node address is: 1234. hall.lamp.

On the basis of the packet format discussed above, the controller sends a packet 200 to turn the lamp ON. It will be seen that the packet contains header information, addressto information, addressfrom information, the function to be performed (FN) and data which, in this case, is empty. The lamp node or module receives the command signal from the controller and, as described above with reference to FIG. 5, its turns its output, that is, the signal to the lamp ON. The lamp also responds to the acknowledge request bit in the header (AKReq) and sends out an acknowledgement packet 202. This time it will be seen that the address is 1234. main.controller and the address from is that lamp, that is: 1234. hall.lamp. In this case, the function FN is specified as acknowledge (AK) and, once again, the data is empty. The acknowledge signal is sent from the lamp 20 and the controller receives acknowledgement knowing that the command signal which has been sent out has been performed by the node, in this case switching the lamp on.

Figure 8:
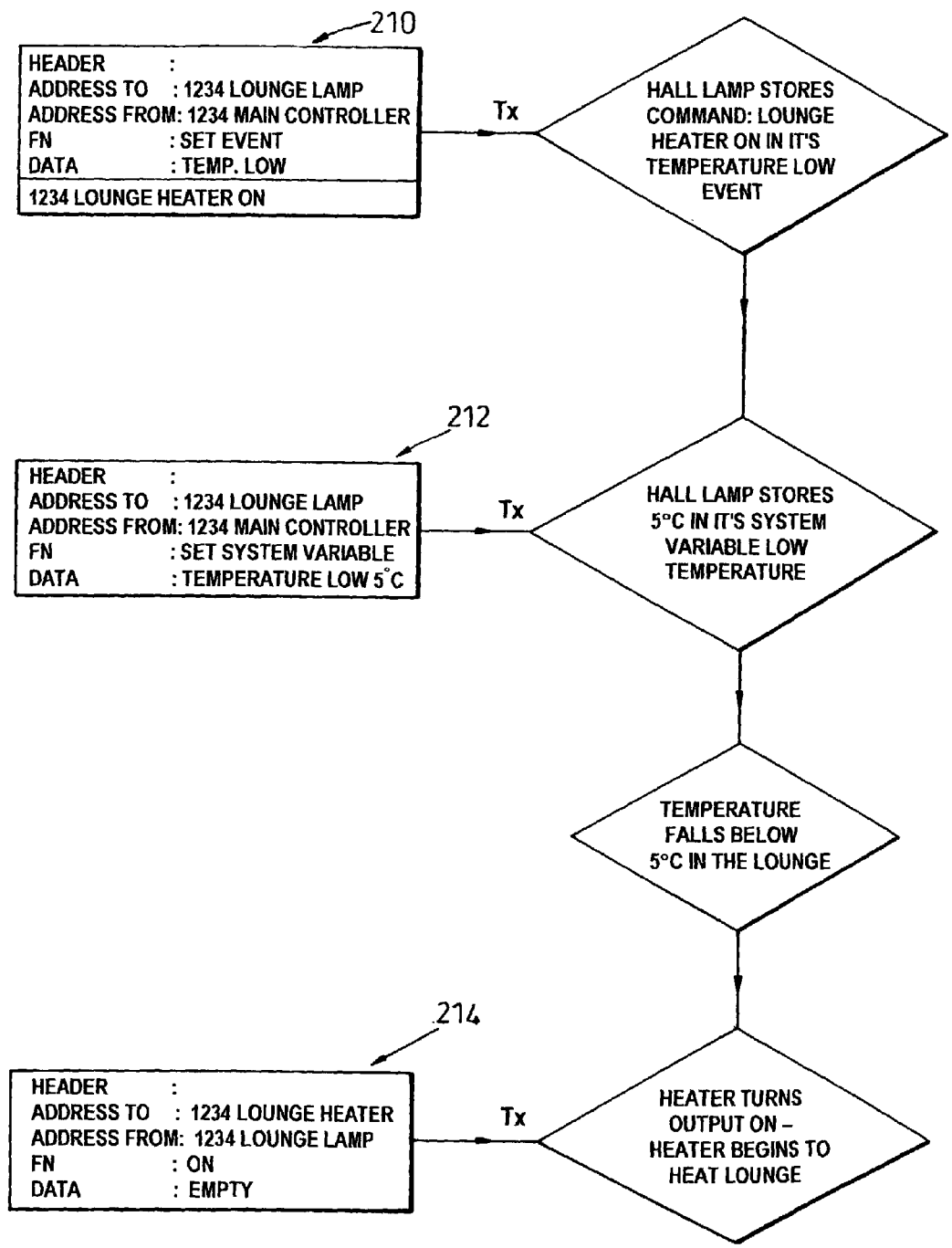
FIG. 8 is a flow chart of operations for a controller forming a node into a thermostat and for switching the heater on in FIG. 1.

Reference is now made to FIG. 8 of the drawings which depicts a flowchart of operations for a controller for turning a node into a thermostat and then for switching the lounge heater 24 (shown in FIG. 1) on.

In the set-up procedure shown in FIG. 8, the controller 10 sends a packet 210 to the hall lamp which stores the command "lounge.heater.on" in its temperature low event. The packet being sent identifies the location of the lamp and the sender. It also specifies the function, that is if temperature is low, then switch the lounge heater at the address 1234. lounge.heater.on. The controller then sends a specific packet 212 which includes the function "SETSYSVAR" (set system variable) with a further command for temperature low 5° C. This packet is also transmitted to the hall lamp which stores the variable 5° C. in its system variable low temperature.

This information is now stored in memory and the hall lamp will now execute the command in the temperature low event when its temperature sensor detects a temperature below 5° C.

When the temperature does fall below 5° C. in the lounge, the hall lamp node then detects this drop in temperature and executes a TEMPLOW event and transmits a further packet 214 to the lounge heater from the lamp with instructions to switch the heater on. The heater node receives the packet 214 and turns its output on and consequently the heater 24 begins to heat the lounge.

It will be appreciated that similar events can be set for high temperature, button presses etc. As can be seen from the flowchart, once the event is set up the communication occurs from node to node without the controllers intervention offering a significant advantage that no controller is needed and that the function of nodes can be changed creating new products, for example, a socket unit can be re-programmed as a timer or thermostat.

Various modifications may be made to the apparatus hereinbefore described without departing from the scope of the invention. For example, the domain address can include a hierarchy of four or more components, so that the system can be used in nursing homes, hospitals etc. and not just the domestic environment, e.g. hospital.ward.bed.object.

It will be appreciated that inputs to the control unit described above are provided by tactile keys. Inputs may be provided by voice activation or by light, such as a laser, selecting various objects to be controlled. The control and communication modules may be coupled to any suitable household appliance which requires to be controlled by a disabled user. For example, a door may be opened or closed, a window may be opened or closed, or an electrical appliance may be switched on or off. In the case of a VCR, a particular channel may be selected and the function of the VCR may be selected, for example, rewind or fast forward. In the case of a television, a particular channel may be selected or volume controlled. In the case of a heater, a thermostat may be set to a pre-determined temperature and lamps can be not only switched on or off but coupled to a dimmer to set a pre-determined level of lighting.

In addition, for the severely handicapped or disabled person, the control unit may be actuated remotely by a carer using the telephone system either mobile or land-based, e.g. using the internet. For example, using a mobile telephone, a carer can control operation of the control unit in a person's house. For example, at a pre-determined time the carer may dial up and close the curtains, switch the light on, the heater on and put the television on. They could also switch on an oven so that by the time the carer gets to the house, the ambient temperature and lighting are selected and the oven is ready to cook a meal, for example. In the same way, an electric blanket could be controlled. This means that at all times it is possible for carer to monitor and, indeed, control appliances within a user's house and this is particularly advantageous in the case of severely disabled persons. It is important, for example, if the carer has been unexpectedly held up, for example, by roadworks or an accident, the carer can still use a telephone to control appliances remotely in the user's house. The system and components may be used in hospital, nursing home and business environments in addition to domestic environments.

A further advantage is that appliances may be used to switch other appliances via the communication modules and not necessarily via the control unit. For example, in the embodiment given above, the lamps sends a signal to switch a heater on at a pre-determined temperature. This can be achieved using appropriate sensors coupled to appropriate communication modules and can be pre-set to provide a particular control sequence or arrangement within a user's house, depending on the specific user's requirements.

A further advantage is that modules can readily be re-programmed and useable within the different areas to accommodate changing requirements of a user. The modules are based on the same circuitry, such that they are interchangeable between various rooms and, indeed, houses, so that the same basic system can be installed throughout a variety of households leading to uniformity and consistency in using the system. A further advantage is that no hardwiring is required minimising the cost of installation and allowing for retrofitting of such systems to existing households.

The invention claimed is:

1. A wireless communication and control system for remotely controlling the operation of a plurality of objects in a domestic environment, said wireless communication and control system comprising:

a wireless control unit having a display and user input means for inputting user commands to the control unit, a microprocessor disposed in said control unit for executing input signals and providing output signals, said microprocessor being coupled to said display and to an output interface, said wireless control unit having a programmable address, the display being controllable by said microprocessor to display a list of objects to be controlled from said wireless control unit, an object from the list being selectable by a user via said user input means, a plurality of separate remote wireless communication modules each coupled to an object to be controlled or from which status is required, each remote wireless communication module having a microprocessor and an unique identification code and a corresponding hierarchical address corresponding to the identification code and defining the physical location and function of the object in said domestic environment and at least one of a wireless receiver for receiving control or status signals and a wireless transmitter for transmitting control or status signals, the arrangement being such that in response to a user input, at least one object to be controlled is selected from the display and a control signal broadcast from said wireless control unit, said wireless broadcast signal containing at least one hierarchical address of said at least one object, said address having a first code portion identifying the location of said at least one object by at least two hierarchical levels, a second code portion identifying the control unit by said at least two hierachical levels, a data code portion containing control information for operating said at least one object and a check code portion for checking the integrity of said control signal, those of the plurality of remote wireless communication modules with at least one address marching said first code portion responding to said broadcast control signal and operating said at least one object in accordance with information contained in said data code portion.

2. A method as claimed in claim 1 wherein the wireless communication is by radio-frequency (RF).

3. A method as claimed in claim 1 wherein the method also includes the steps of changing the status of a visible indicator or audible indicator on the object module when the command has been received by the object module.

4. A method as claimed in claim 1 wherein the method further includes the steps of providing the user with a visible or audible indicator via the control unit that the command has been received at the object module and that the appliance is operating according to the command.

5. A method as claimed in any one of claim 1 wherein the method also includes the steps of continuously polling all the object modules in the system by the control unit to check the status of each abject.

6. A method as claimed in claim 1 wherein the method includes the step of transmitting a failure signal from an object module to the control unit in the event of failure or unexpected changes in operating status of the object.

7. A method as claimed in claim 1 wherein the method also includes the steps of programming a set of commands into the microprocessor of the control unit and downloading the program of commands to a selected object module to respond to said commands at pre-programmed times or time intervals.

8. A method as claimed in claim 1 wherein the method includes the step of RF broadcasting the command signal to all object modules and rebroadcasting by said object modules, using RF, the signal to all modules when the interface module is out of range of the control unit.

9. A method of operating a plurality of remote devices from a control unit including the steps of:

providing a wireless control unit having a display and user input means for inputting user commands to the control unit, a microprocessor disposed in said control unit for executing input signals and providing output signals, said microprocessor being coupled to said display and to an output interface, said wireless control unit having a programmable address, the display being controllable by said microprocessor to display a list of objects to be controlled from said wireless control unit, an object from the list being selectable by a user via said user input means;

providing a plurality of separate remote wireless communication modules each coupled to an object to be controlled or from which status is required, each remote wireless communication module having a microprocessor and an unique identification code and a corresponding hierarchical address corresponding to the identification code and defining the physical location and function of the object in said domestic environment and at least one of a wireless receiver for receiving control or status signals and a wireless transmitter for transmitting control or status signals; and in response to a user input, selecting from the display at least one object to be controlled and broadcasting a control signal from said wireless control unit, said wireless signal containing at least one hierarchical address of said at least one object, said address having a first code portion identifying the location of said at least one object by at least two hierarchical levels, a second code portion identifying the control unit by said at least two hierarchical levels, a data code portion containing control information for operating said at least one object and a check code portion for checking the integrity of said control signal, those of the plurality of remote wireless communication modules with at least one address matching said first code portion responding to said broadcast control signal and operating said at least one object in accordance with information contained in said data code portion.

10. A method as claimed in claim 9 wherein the method further includes the step of transmitting a confirmatory signal from the wireless object module to the wireless control unit to confirm that the command has been received.

* * * * *

UNITED STATES PATENT AND TRADEMARK OFFICE
CERTIFICATE OF CORRECTION

PATENT NO.       : 7,127,270 B2
APPLICATION NO.  : 10/110521
DATED            : October 24, 2006
INVENTOR(S)      : John Sinclair It is certified that error appears in the above-identified patent and that said Letters Patent is hereby corrected as shown below:

Column 1, line 39, replace "disable" with --disabled--

Column 2, line 10, delete "under"

Column 2, line 37, replace "system" with --systems--

Column 5, line 27, replace "including" with --include--

Column 5, line 29, replace "replace" with --replaced--

Column 5, line 33, replace "modules" with --module--

Column 5, line 59, replace "modules are" with --modules that are--

Column 8, line 50, replace "RP" with --RF--

Column 10, line 43, replace "a" with --an--

Column 14, line 7, replace "preamble" with --preamble:--

Column 14, line 8, replace "start" with --start:--

Column 14, line 9, replace "header" with --header:--

Column 14, line 10, replace "priority" with --priority:--

Column 14, line 11, replace "extended@" with --extended@:--

Column 14, line 13, replace "relayed" with --relayed:--

Column 14, line 15, replace "packet type" with --packet type:--

Column 14, line 25, replace "address to" with --address to:--

Column 14, line 27, replace "address from FN" with --address from FN:--

Column 14, line 29, replace "data" with --data:--

Column 14, line 34, replace "CRC" with --CRC:--

UNITED STATES PATENT AND TRADEMARK OFFICE
CERTIFICATE OF CORRECTION

PATENT NO.        : 7,127,270 B2
APPLICATION NO. : 10/110521
DATED             : October 24, 2006
INVENTOR(S)       : John Sinclair It is certified that error appears in the above-identified patent and that said Letters Patent is hereby corrected as shown below:

Column 16, line 19, replace "lamps" with --lamp--

Column 17, line 10, replaec "marching" with --matching--

Column 17, line 25, delete "any one of"

Column 17, line 28, replace "abject" with --object--.

Signed and Sealed this

Twentieth Day of March, 2007

JON W. DUDAS
*Director of the United States Patent and Trademark Office*